LOW IMPEDANCE OSCILLATOR

Filed Sept. 23, 1946 4 Sheets-Sheet 1

Inventors
Irvin W. Cox
Lester D. Drugmand
Raymond E. Mekelburg
By Frank H. Hubbard
Attorney Oct. 23, 1951 I. W. COX ET AL 2,572,320

LOW IMPEDANCE OSCILLATOR

Filed Sept. 23, 1946 4 Sheets-Sheet 2

Inventors
Irvin W. Cox
Lester D. Drugmand
Raymond E. Mekelburg
By Frank H. Hubbard
Attorney Fig. 9
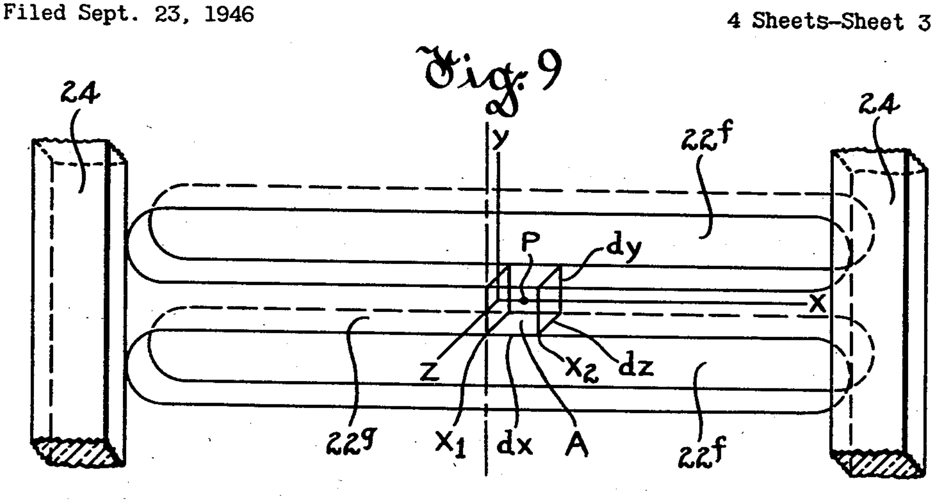
Fig. 10
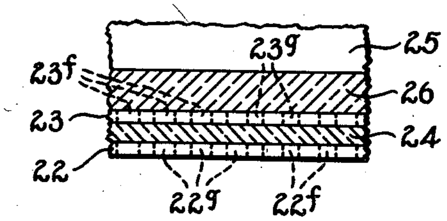
Fig. 11
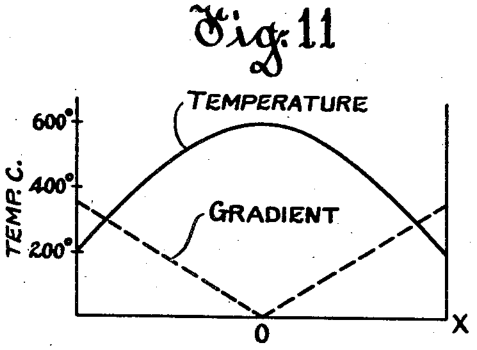
Fig. 12
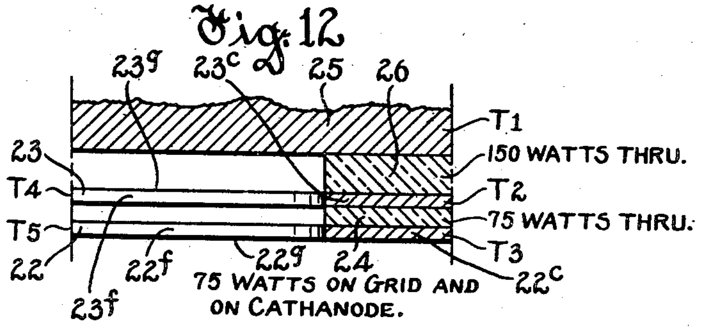
Fig. 13
| METAL | K (WATTS) | T1 (°C.) | T2 (°C.) | T3 (°C.) | T4 (°C.) | T5 (°C.) |
|---|---|---|---|---|---|---|
| SEALMET #4 | .146 | 50 | 117 | 134 | 295 | 315 |
| KOVAR | .193 | 50 | 117 | 134 | 204 | 221 |
| TUNGSTEN | 1.6 | 50 | 117 | 134 | 134 | 151 |
| MOLYBD. | 1.46 | 50 | 117 | 134 | 136 | 153 |
| COPPER | 3.88 | 50 | 117 | 134 | 124 | 144 |
Inventors
Irvin W. Cox
Lester D. Drugmand
Raymond E. Mekelburg
By Frank H. Hubbard
Attorney

LOW IMPEDANCE OSCILLATOR

Filed Sept. 23, 1946 4 Sheets-Sheet 4

Inventors
Irvin W. Cox
Lester D. Drugmand
Raymond E. Mekelburg
By Frank H. Hubbard
Attorney Patented Oct. 23, 1951

2,572,320

UNITED STATES PATENT OFFICE 2,572,320

LOW IMPEDANCE OSCILLATOR

Irvin W. Cox, West Allis, Lester D. Drugmand, Greenfield, and Raymond E. Mekelburg, Milwaukee, Wis., assignors to Cutler-Hammer, Inc., Milwaukee, Wis., a corporation of Delaware Application September 23, 1946, Serial No. 698,822

17 Claims. (Cl. 313—268)

This invention relates to improvements in low impedance oscillators, and the invention relates more particularly to a grid controlled arc-cathanode power tube.

A primary object of the invention is to improve and simplify the construction and the reliability of operation of low impedance oscillator type power tubes.

Another object is to provide a novel form of mercury pool type grid controlled arc cathanode power tube, wherein an arc from a cathode spot may be utilized as the source of electrons.

Another object is to provide for use of a hot cathode xenon filled grid controlled arc-cathanode power tube wherein an arc in xenon is utilized as a source of electrons.

Another object is to provide a novel form of the anode, grid and cathanode, and a novel arrangement thereof at the upper end of the tube.

Another object is to provide means for insuring a uniform and extremely small space between the cathanode and the anode, whereby ionization in this space is effectively prevented.

Another object is to provide such an arrangement of the anode and the cathanode that the novel form of grid positioned therebetween will have substantially the same characteristics as the grid in a high vacuum tube.

Another object is to provide novel means for effecting cooling of the anode, and consequently of the cathanode and grid.

Another object is to provide a novel assembly of the anode, grid and cathanode with respect to each other and with respect to the glass upper end of the tube.

Another object is to provide cooling means of novel form.

Other objects and advantages of the invention will hereinafter appear.

The accompanying drawings illustrate a preferred embodiment of our invention, which will now be described; it being understood that the embodiment illustrated is susceptible of modification in respect to certain structural details thereof without departing from the scope of the appended claims.

In the drawings,

Fig. 9 is a view illustrating diagrammatically and schematically the heat exchange system employed in cooling the cathanode and the grid.

Fig. 10 is an enlarged fragmentary sectional view of the assembly of the anode, grid and cathanode, with the glass spacing elements respectively interposed therebetween.

Fig. 11 is a graph illustrating the manner in which the heat is transferred from the slotted to the unslotted portions of the grid and cathanode and through the glass strips to the anode, to maintain the cathanode at a substantially constant desired temperature.

Fig. 12 is a sectional view similar to Fig. 10, but taken at substantially right angles to the latter.

Fig. 13 is a chart showing the heat transfer characteristics of various different metals which may be employed to form the anode, the grid and the cathanode.

Figures 1, 2:
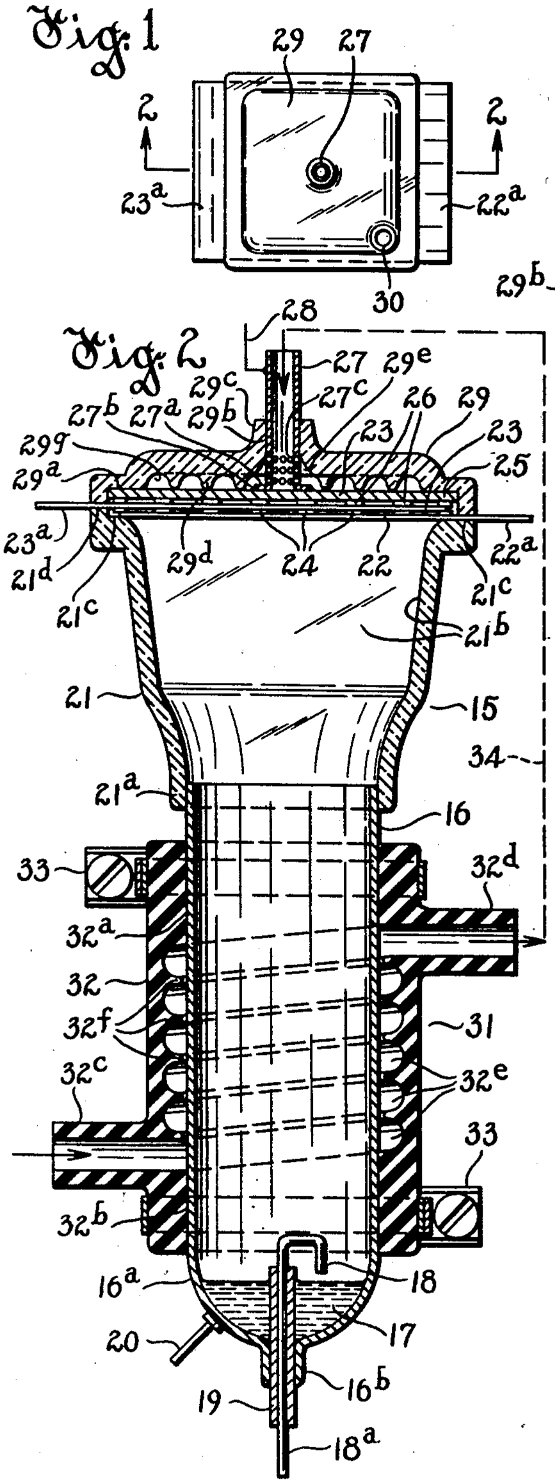
Figure 1 is a top plan view on a reduced scale, of a grid controlled arc-cathanode power tube constructed in accordance with our invention.
Fig. 2 is a vertical sectional view (substantially normal size) on the line 2—2 of Fig. 1.

In the drawings (see Fig. 2,) the numeral 15 designates a low impedance, high frequency power oscillator constructed in accordance with our invention; said tube being adaptable for use in conjunction with commercial power lines to provide a direct supply of high frequency current. The tube 15 shown (full size) in Fig. 2 may be supplied with rectified current from a three-phase line at 440 volts A. C.; or the same may alternatively be supplied with power as low as 220 volts D. C.

The numeral 16 designates a substantially cylindrical metal member which is adapted to form the lower portion of the tube; member 16 having an approximately hemispherical lower end 16[a], within which is located the mercury pool 17. A known form of igniting electrode 18 is positioned in the usual manner with respect to mercury pool 17; said electrode 18 being sealed within a tube 19 of glass or similar insulating material, to shield the former from direct contact with the mercury pool 17. Tube 19 is in turn sealed to the tubular downward extension $16^b$ of the lower end wall of member 16. The exposed end $18^a$ of electrode 18 is adapted to be connected in an igniter circuit of any suitable or well known form. The numeral 20 designates a terminal affording a known circuit connection for the cathode composed of member 16 and the mercury pool 17.

Figure 4:
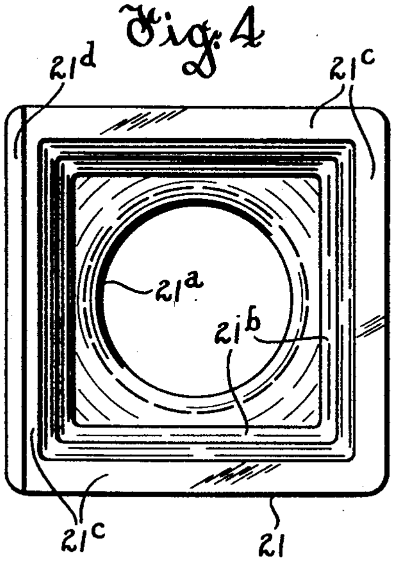
Fig. 4 is a top plan view of the pressed glass flare, which is adapted to form a part of the upper end portion of the tube.
Figure 5:
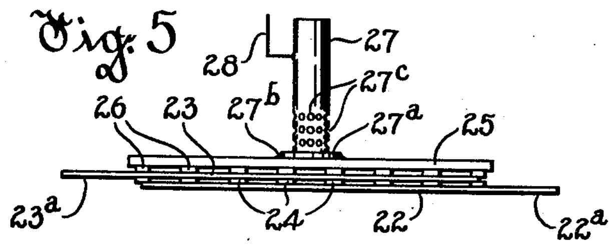
Fig. 5 is a side elevational view of the anode, grid and cathanode united as a unit in assembled relationship to each other; such unit including the tube which is utilized both as a terminal for the anode and as an inlet for the cooling liquid.

Surrounding and fused or otherwise sealed to the upper end of member 16 is the reduced cylindrical lower end $21^a$ of a pressed glass member 21, the peripheral wall of which is flared outwardly and upwardly to a substantially square contour, as indicated at $21^b$ in Figs. 2 and 4. Member 21 is provided with a flat peripheral upper edge $21^c$ upon which a so-called cathanode member 22 (Fig. 2) of rectangular contour is adapted to seat in the manner hereinafter described. Cathanode 22 is provided with an extension $22^a$ at one end thereof (Figs. 1 and 2) to form a terminal to which a suitable circuit wire may be brazed, soldered or otherwise attached. Member 21 is provided at the left-hand side thereof with a raised edge portion $21^d$ (Figs. 2 and 4) to form a seat for the inner end of the terminal extension $23^a$ formed integrally with the grid member 23 of the tube. Grid member 23 and cathanode 22 are preferably of identical form and size, but are merely reversely mounted, as illustrated, to provide for exposure of the terminal portions $23^a$ and $22^a$ at opposite sides of tube 15.

In the completely assembled relationhip of the parts shown in Figs. 2, 10 and 12 cathanode 22 is rigidly attached to grid 23, in a predetermined spaced relationship thereto, through the medium of a plurality of relatively narrow and very thin glass strips 24, and grid 23 is likewise rigidly attached to the anode 25, which preferably consists of a square plate of a suitable metal in a predetermined spaced relationship thereto, through the medium of a plurality of glass strips 26 which are of the same width, as but substantially thicker than, the aforementioned strips 24. Such attachment of said parts is effected by applying pressure to a pair of plates (not shown) respectively overlying anode 25 and cathanode 22 while simultaneously applying heat to fuse or plasticize the glass strips 24 and 26; means of the character hereinafter described being utilized to insure the predetermined desired spacing of cathanode 22 from grid 23 and of the latter from anode 25.

Either before or after assembly of cathanode 22 and grid 23 with respect to anode 25, a metal tube 27 (Fig. 2) has its lower end flange $27^a$ welded, brazed or otherwise rigidly attached to the upper surface of anode 25, in centered relationship thereto, as indicated at $27^b$. Tube 27 is provided adjacent its lower end with a multiplicity of holes or perforations $27^c$. Tube 27 thus serves as a terminal for anode 25, for attachment of a suitable circuit wire shown diagrammatically at 28; and also as an inlet for the cooling liquid (such as water) which is adapted to circulate in contact with the upper surface of anode 25.

Figure 3:
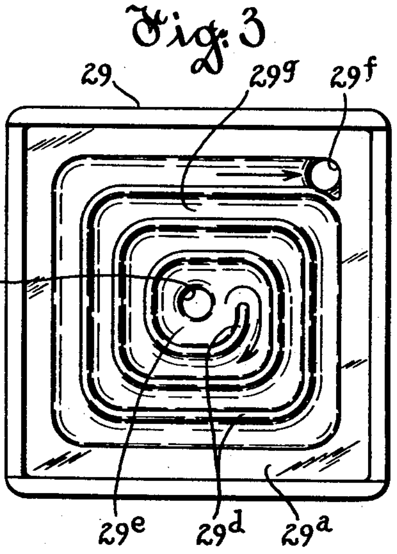
Fig. 3 is a bottom plan view of the pressed glass cover member or top of the tube, with the anode (plate) and its associated metal tubing omitted for purposes of illustration.

More particularly, the aforedescribed assembly of anode 25, tube 27, grid 23, cathanode 22, and the glass strips 26 and 24 is deposited within the rectangular recess $29^a$ formed in the lower surface of cover member 29; said cover member 29 having a central opening $29^b$ to accommodate, and an upwardly extending integral flange $29^c$ to overlap a portion of, tube 27 above the perforations $27^c$ in the latter. The glass of top member 29 is then heated in any suitable manner to fuse or plasticize at least certain portions thereof, whereby the anode 25 may be sealed within the recess $29^a$ and sealed in contact with the downwardly projecting integral ridge $29^d$, which is preferably in the form of a rectangular spiral extending from a point adjacent the frustoconical recess $29^e$ to a point adjacent the outlet opening $29^f$ (see Fig. 3). Spiral ridge $29^d$ thus forms, in conjunction with the upper surface of anode 25 (Fig. 2), a spiral groove $29^g$ for passage of the cooling liquid in contact with said anode surface.

Referring more particularly to the parts forming the anode, grid and cathanode region shown in the drawings, the construction thereof is preferably as follows: The grid 23 and the cathanode 22 are punched from metal sheets (of like metal) .005 of an inch thick; and for a tube of the size herein illustrated the active portion of each of the members 22 and 23 is 2¾ inches square; the grid 23 having the aforementioned terminal portion or extension $23^a$ and the cathanode 22 having a like terminal portion $22^a$. The active portion of each of the members 22 and 23 is provided with seven symmetrically arranged rows of slots $22^b$, $23^b$ (see Fig. 6), with ⅛ inch wide spaces $22^c$, $23^c$ between the rows; a ⅛ inch wide space $22^d$, $23^d$ at each longitudinal side of the respective members 22 and 23; and a space $22^e$, $23^e$ about $\frac{1}{16}$ inch wide at one end of each member 22 and 23. Each slot $22^b$, $23^b$ (see the enlarged view thereof at $22^f$ in Fig. 7) is ¼ inch long and .010 of an inch wide, with an area of sheet metal $22^g$ approximately .008 of an inch wide separating the slots in each row. It is these areas (or isthmuses) $22^g$ of material which must conduct the heat transversely to the solid areas or spaces $22^c$, $22^d$, $22^e$, $22^a$ and $23^c$, $23^d$, $23^e$ $23^a$ of the respective sheets 22 and 23, from where it is conducted (from member 22 to member 23, through the medium of the thin glass strips 24, and from member 23, through the medium of the relatively thicker glass strips 26) to the water-cooled anode plate 25 aforementioned.

We prefer that the spacing between cathanode 22 and grid 23 shall be .010 of an inch, and that the spacing between grid 23 and anode 25 shall be .020 of an inch. The product of these spacings, with very close tolerances, may be insured by the method and means now to be described:

Strips (not shown) of partially sintered magnesia ¼ of an inch wide, by .010 of an inch thick, by approximately 2¾ inches long will be laid on the respective rows of slots in the cathanode, and these strips of magnesia will be alternated with strips of glass 24 slightly less than ⅛ of an inch wide, slightly thicker than .010 of an inch, and approximately 2¾ inches long; the glass strips 24 being alined with the unslotted portions $22^c$ of cathanode 22. Between grid 23 and anode 25 similar spacing strips, composed of partially sintered magnesia, ¼ of an inch wide, by .020 of an inch thick, by 2¾ inches long, are positioned alternately in the aforedescribed manner with glass spacers slightly more than .020 of an inch thick, slightly less than ⅛ of an inch wide, and approximately 2¾ inches long. The laminated group of elements, or "sandwich," thus formed will be brought to the fusing temperature of the glass strips 24 and 26 and compressed to the required degree between a pair of flat plates (not shown), so that the spacing provided between cathanode 22 and grid 23, and between the latter and anode 25, will be that provided by the respective groups of unfused magnesia strips aforementioned.

The glass of the respective groups of strips 24 and 26 (Figs. 10 and 12) will be chosen so as to be compatible with the metal or metals of which cathanode 22, grid 23 and anode 25 are composed. For example, if said cathanode, grid and anode are each composed of an iron-nickel-chromium alloy such as that sold under the trade named of "Kovar," the glass of which strips 24 and 26 are formed may consist of a borosilicate glass such as that sold commercially under the trade name of Corning "7052" glass. Similarly if the metal parts just mentioned are composed of an iron-nickel-chromium alloy such as that sold commercially under the trade name of "Sealmet #4," the borosilicate glass sold commercially under the trade name of Corning "GI" glass may be employed therewith. In like manner, if the metal parts are composed of tungsten, the borosilicate glass sold commercially under the trade name of Corning "772 Nonex" glass may be united therewith by the method of treatment aforedescribed.

As aforestated, the sheet forming the cathanode 22 projects to one side of the square, to provide a terminal $22^a$ for attachment of a circuit wire; and the sheet forming the grid 23 has a terminal $23^a$ projecting from the opposite side of the tube 15. Also, as aforedescribed, tube 27 (which is perforated as shown at $27^c$, and welded to anode 25) may have the circuit wire 28 (Figs. 1 and 2) attached thereto.

The assembly as a laminated unit of the parts just described is then inserted into the recess $29^a$ in the moulded glass top member 29. As aforedescribed, upon subjection of this combination of elements to a heat treatment of such degree as to provide for fusion or softening of the glass of top member 29 the anode 25 will be peripherally sealed thereto, and the rectangular spiral passage $29^g$ for the cooling water will extend from the combined inlet tube and anode terminal 27 to the outside or outlet tube 30 (Fig. 1) which is sealed within the aforementioned outlet opening $29^f$ (Fig. 3) in cover member 29.

The aforementioned moulded glass flare 21 having a square upper end portion of a size corresponding to that of cover member 29 fits against the lower or cathanode side of the assembly of cover member 29 with the unit comprising anode 25, grid 23, cathanode 22, glass strips 24 and 26, and the aforementioned strips of magnesia. The peripheral portions of cover member 29 and flare 21 are then heated quite hot and pressed toward each other, so that a vacuum type seal is provided between cover member 29 and anode 25; between grid 23 and glass members 29 and 21; between cathanode 22 and glass members 29 and 21, and between the glass members 29 and 21 themselves. The upper end portion of the tube is thus separated into two chambers, a cooling chamber (at the upper surface of anode 25), and an anode-grid-cathanode region (at the lower surface of anode 25).

After assembly of the glass members 29 and 21 and the parts interposed therebetween, as just described, the assembly is preferably inverted, and a quantity of dilute acid is poured into member 21 to dissolve and thus provide for ready removal of, the magnesia of which the aforementioned spacers were composed. After dumping of the acid, the assembled parts may be rinsed with a suitable liquid (such as distilled water) and then heated to insure complete removal of such liquid.

The lower end portion of the aforementioned glass member 21 may then be heated to fuse and seal the same in vacuum-tight relationship to the open upper end of metal member 16 (Fig. 2); the mercury pool 17 and the arc-initiating device 18, 19 having been previously assembled with respect to member 16. Tube 15, when thus completely assembled, is processed and evacuated in any well known or usual manner applicable to mercury arc rectifier tubes; after which treatment the arc cooling means 31 is assembled with respect thereto; after which the tube 15 is ready for use.

As shown, the arc cooling means 31 preferably comprises a substantially cylindrical hollow moulded insulating member 32, which is preferably composed of rubber or a rubber-like material. Member 32 has molded therein a central through passage, the upper and lower end portions, at least, of which are adapted for a rather close but sliding fit over metal member 16, as indicated at $32^a$ and $32^b$ in Fig. 2. A pair of hose-type clamps 33 are adjustably attached in surrounding relationship to the upper and lower end portions of member 32, to render the connection of the latter to member 16 water-tight. Member 32 has molded integrally therewith an inlet tube or nozzle portion $32^c$ and an outlet tube or nozzle portion $32^d$; an integrally molded spiral groove $32^e$ affording communication between said tube portions $32^c$ and $32^d$. The spiral rib $32^f$, which defines the groove $32^e$ is preferably spaced slightly away from the outer surface of member 16, as shown, to provide a maximum area of contact of the cooling water with said surface while insuring a spiral flow of the major portion of the water. If desired, of course, the spiral rib might be so shaped by the molding operation as to provide for contact thereof throughout its length with member 16.

In practice inlet tube portion $32^c$ is connected by a tube or hose (not shown) with a suitable source of supply of cooling water, the initial temperature and/or rate of flow of which may be controlled in any well known manner. As shown in dotted lines at 34 in Fig. 2, we prefer to provide a conduit connection between the outlet tube portion $32^d$ of the arc-cooling device and the inlet tube 27 of the cooling means for anode 25 and the grid 23 and cathanode 22 associated with the latter. The primary purpose of such arrangement is to insure that the warm water (or other cooling liquid) after discharge thereof from tube portion $32^d$ will then be passed through the spiral groove $29^g$ in contact with anode 25; so that anode 25 will always be at a few degrees higher temperature than the peripheral wall of the arc chamber, as represented by member 16; thus insuring against condensation of mercury vapor in the cathanode-anode region, where it might cause a short-circuit. The initial temperature and/or rate of flow of the cooling water is preferably such that the temperature of anode 25 will be maintained substantially constant at about 50 degrees C. The heat from the cathanode and the grid will be conducted through the glass strips or spacers 24 and 26 to the anode 25 as thus cooled.

In the particular size of tube 15 herein illustrated the total area of the glass spacers 26 in contact with anode 25 is approximately 15 square centimeters. The thickness of glass (strips 24 and 26) between the cathanode 22 and anode 25 is .030 of an inch, or approximately .075 of a centimeter. If it be assumed that the unslotted portions of the cathanode 22 are at a temperature of 200 degrees C., the temperature difference between the cathanode 22 and the anode 25 will be approximately 150 degrees C.; and for glass having a coefficient of thermal conductivity of .0075 watt per square centimeter per degree C. per centimeter length, the total wattage which may be conducted away from the cathanode 22 between these two temperatures is 225 watts. At 3 volts anode drop and 25 amperes arc current, only about 75 watts would fall on the cathanode 22. The aforedescribed tube 15, therefore, has a considerable margin of safety in this respect.

Figure 6:
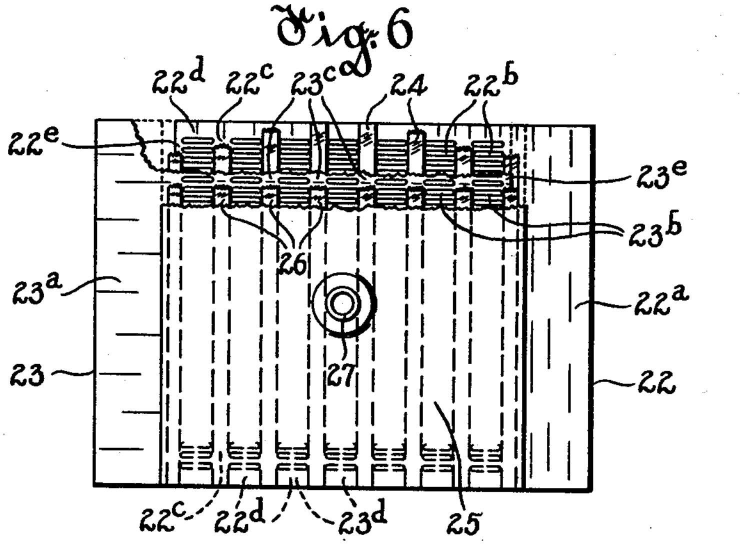
Fig. 6 is a top plan view of the unit shown in Fig. 5, certain portions of the anode and grid and the glass spacer elements being broken away for purposes of illustration.

Fig. 9 is utilized to diagrammatically illustrate the ability of the relatively narrow areas $22^{g}$ (between the cathanode slots $22^{f}$) to conduct the heat from the slotted portions of cathanode 22 over to the unslotted portions $22^{c}$ thereof (see Fig. 6). (This analysis is, of course, likewise applicable to the grid member 23.) Thus, inasmuch as the length of each slot $22^{f}$ is ¼ of an inch, the maximum distance over which heat must be transferred is ⅛ of an inch, or about .3 of a centimeter. The temperature distribution over the length of each slot $22^{f}$ is parabolic, and if it be assumed that the maximum temperature at the mid-length of the slot $22^{f}$ may be as high as 600 degrees C. without damage, and, as before, if the temperature of the unslotted portions is assumed to be 200 degrees C., the wattages which may be transferred from the portions $22^{g}$ (between the slots $22^{f}$) to the unslotted portions $22^{c}$ are set forth in the right-hand column of the following table, wherein "K" indicates the thermal conductivity value in watts per centimeter per degree C.:

| Metal | "K" | Watts |
|---|---|---|
| "Kovar" | .193 | 224 |
| Nickel | .586 | 650 |
| Copper | 3.88 | 4,000+ |
| Molybdenum | 1.46 | 1,700 |
| Tungsten | 1.60 | 1,800 |
| "Sealmet #4" | .146 | 170 |
| Silver | 4.19 | 4,000+ |
| Tantalum | .544 | 600 |

The maximum usable wattage for the particular size of tube 15 herein disclosed is, of course, 225 watts. However, by forming the cathanode 22 and the grid 23 of copper, silver, molybdenum or tungsten it is possible to get this 225 watts at a much lower maximum temperature than 600 degrees C. That is to say, the temperature gradient would be smaller. There are, of course, good reasons for not using copper or silver in the mercury arc type of tube; but molybdenum, tungsten, nickel and tantalum may be employed for this purpose. Copper or silver may, however, be employed in a modification using a hot cathode arc in xenon atmosphere, as will be understood by those skilled in the art. A cathanode 22 and a grid 23 formed of tungsten, molybdenum or tantalum would be especially desirable, because of the ability of these metals to withstand positive ion bombardment. From the foregoing it is obvious that a tube of the character herein disclosed is capable of handling the maximum thermal load to which it may be subjected, at the indicated power level; that is to say, about four kilowatts at 220 volts anode current.

More specifically considering the diagrammatic showing of Fig. 9, and assuming:

A=area
T=temperature
$t$=time
K=thermal conductivity in watts per square centimeter per degree C.
C=specific heat
$d$=specific gravity
W=electrical energy received per second in watts per c. c.
Q=heat in watt seconds.

The differential equation for heat flow across surface A in direction $x$ is:

$$\frac{dQ}{dt}=-\frac{KAdT}{dx}$$

Consider the element of volume centered about point P (Fig. 9). The flow of heat in the direction $x$ through point P is:

$$-K\frac{\delta T}{\delta x}\text{ per unit area}$$

and its value at face $x_2$ is:

$$-K\frac{\delta T}{\delta x}-\frac{\delta}{\delta x}\left(K\frac{\delta T}{\delta x}\right)\frac{dx}{2}$$

and the rate at which the heat is flowing out of the element in the direction $x$ is:

$$\left[-K\frac{\delta T}{\delta x}-\frac{\delta}{\delta x}\left(K\frac{\delta T}{\delta x}\right)\frac{dx}{2}\right]dy\,dz$$

The influx of heat at $x_1$ is:

$$\left[-K\frac{\delta T}{\delta x}+\frac{\delta}{\delta x}\left(K\frac{\delta T}{\delta x}\right)\frac{dx}{2}\right]dy\,dz$$

Subtracting the flow at $x_2$ from that at $x_1$, there results:

$$K\frac{\delta^2 T}{\delta x^2}dx\,dy\,dz$$

as heat gained by flow, where K is independent of $x$. The amount of electrical energy received per second by the volume element is:

$$W\,dx\,dy\,dz$$

Then, in respect of the heat flow in the direction $x$ only, we have:

$$\frac{dq}{dt}dx\,dy\,dz=Cd\frac{dT}{dt}dx\,dy\,dz=\left(K\frac{\delta^2 T}{\delta x^2}\right)dx\,dy\,dz$$

or for the steady state, and since $$\frac{dT}{dt}=0$$

$$K\frac{\delta^2 T}{\delta x^2}+W=0$$

$$\frac{\delta^2 T}{\delta x^2}=-\frac{W}{K}$$

$$\frac{\delta T}{\delta x}=-\frac{Wx}{K}A_1$$

But when $X=0$, then:

$$\frac{\delta T}{\delta x}=0$$

$$A_1=0$$

and $$T=-\frac{Wx^2}{2K}+B$$

If the maximum temperature at which the grid will not emit electrons is fixed at 600 degrees C., the value T, when $x=0$, is 600 degrees C., or: $B=600$ degrees C.; and if the value of T, when $x=.3$ cm., is 200 degrees C., then:

$$\frac{.09W}{2K}=400$$

or $$W=\frac{800K}{.09}=8888K$$

W must be multiplied by the actual effective volume of the metal in the grid element; in this case: 7×60×2×2.5×.3×.0002; or .126 cc.; the value .0002 representing *dydz*, where *dy*=0.16 cm., and *dz*=.0125 cm.

Where the value K for the particular glass employed is .0075 watt per square cm. per degree C., and the effective area of the glass spacers (26, Figs. 10 and 12) in contact with anode 25 is 15 square centimeters, the wattage transmitted from cathanode 22 to anode 25, at a temperature difference of 150 degrees C., is:

$$W=\frac{.0075\times 15\times 150^{\circ}\text{ C.}}{.075\text{ watts per sq. cm. per deg. C.}}=225\text{ watts}$$

As aforeindicated, the anode 25 may be composed of sheet steel, if such metal is compatible (or capable of a vacuum type seal) with the particular glass employed in top member 29. If not, the anode 29 may then preferably be composed of the particular metal or metals employed in constructing either the grid 23 or the cathanode 22, or both.

Normally the grid 23 and the cathanode 22 are composed of the same metal, although not necessarily so. However, if the grid and cathanode are composed of different metals, both the metals and the glasses comprising strips 24 and the cover member 29 and flare member 21 must be carefully selected to insure compatibility of these metal and glass elements with respect to each other.

The chart of Fig. 13 shows clearly the maintenance of desired uniform temperatures at the points $T^1$, $T^2$ and $T^3$ of Fig. 12, even though the temperatures at points $T^4$ and $T^5$ of Fig. 12 will vary with the character of the metal employed in constructing the grid 23 and the cathanode 22; the value of K (in watts) in respect of the different metals being likewise illustrated in Fig. 13.

Figure 7:
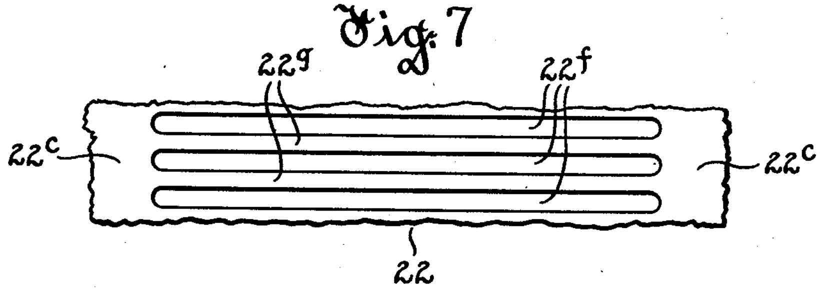
Fig. 7 is an enlarged fragmentary plan view of one of the two sheet metal plates, which are respectively adapted to form the grid and the cathanode of the tube.
Figure 8:
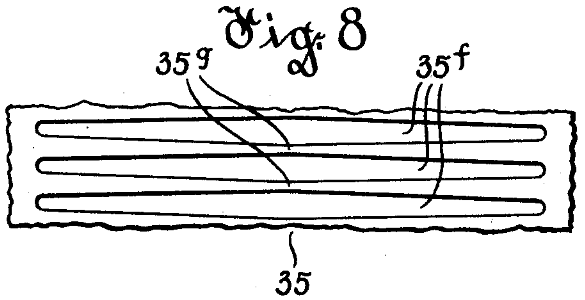
Fig. 8 is a view similar to Fig. 7, but showing a modified form of slots in the grid and the cathanode.

In the enlarged fragmentary view of Fig. 8 the numeral 35 designates a thin sheet metal cathanode or grid member (as at 22 in Fig. 7). However, the slots $35^f$ in Fig. 8 are of modified form, in that the central portions thereof are widened whereas the opposite end portions thereof are narrowed, thus providing slot areas substantially equal to the areas of the respective slots $22^f$ in Fig. 7. As a consequence, the central portions of the heat conducting areas between slots $35^f$ are relatively wider and the opposite end portions of said areas are relatively narrower than the corresponding portions of the isthmuses or solid areas $22^g$ in Fig. 7.

Figure 14:
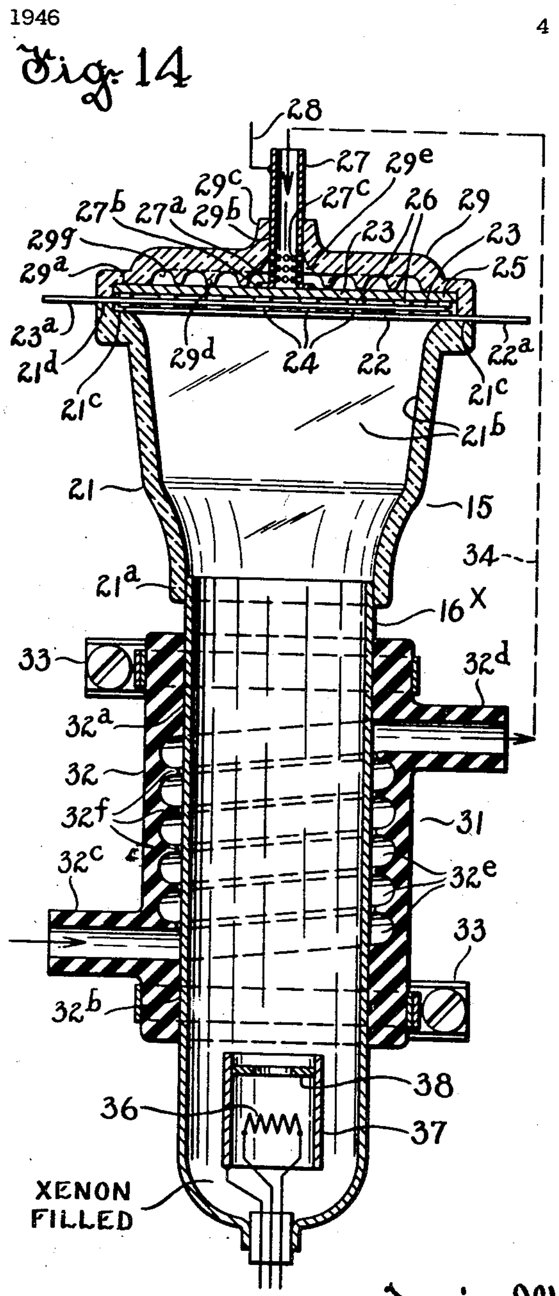
Fig. 14 is a vertical sectional view showing a modified form of the power tube shown in Figs. 1 to 10, inclusive, and 12, wherein a hot cathode-xenon arc is the source of electrons at the cathanode.

In the modification illustrated in Fig. 14, a hot cathode 36 is employed and the tube is filled with xenon at a partial vacuum to provide an arc source of electrons at the cathanode. If desired such a tube may include a known form of grid 37 having a baffle shown diagrammatically at 38, for the purpose of phase-controlling the oscillating power. The metal member $16^x$ of the tube may be like or substantially like the member 16 in Fig. 2; the other elements of the tube of Fig. 14 preferably being like those shown in Fig. 2, and such other elements being given corresponding numerals of reference.

We claim:

1. A low impedance oscillator tube comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper lower surfaces of said grid member on opposite sides of the respective rows of slots in the latter, the glass strips at the lower surface of said grid member being approximately .010 inch thick and the glass strips at the upper surface of said grid member being approximately .020 inch thick, said last mentioned glass strips being fused to said anode and said grid member, and said first mentioned glass strips being fused to said grid member and said cathanode member.

2. A low impedance oscillator comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper and lower surfaces of said grid member on opposite sides of the respective rows of slots in the latter, the glass strips at the lower surface of said grid member being approximately .010 inch thick and the glass strips at the upper surface of said grid member being approximately .020 inch thick, said last mentioned glass strips being fused to said anode and said grid member, said first mentioned glass strips being fused to said grid member and said cathanode member, the metal of which said grid and cathanode members are formed being selected from the group consisting of tantalum, nickel, molybdenum, tungsten, copper, silver, and iron-nickel-chromium alloys and the glass of which said strips are composed being selected to provide compatibility of the particular glass with the particular metal or alloy employed.

3. A low impedance oscillator tube comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper and lower surfaces of said grid member on opposite sides of the respective rows of slots in the latter, the glass strips at the lower surface of said grid member being approximately .010 inch thick and the glass strips at the lower surface of said grid member being approximately .020 inch thick, said last mentioned glass strips being fused to said anode and said grid member, said first mentioned glass strips being fused to said grid member and said cathanode member, a molded glass flare member and a molded glass cover member fused thereto to provide a vacuum type seal therebetween, said unit being interposed between and fused to said cover and flare members, and said anode, grid and cathanode members having wiring terminal elements sealed to and projecting beyond said cover and flare members.

4. A low impedance oscillator tube comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper and lower surfaces of said grid member on opposite sides of the respective rows of slots in the latter, the glass strips at the lower surface of said grid member being approximately .010 inch thick and the glass strips at the upper surface of said grid member being approximately .020 inch thick, said last mentioned glass strips being fused to said anode and said grid member, said first mentioned glass strips being fused to said grid member and said cathanode member, an envelope including a molded glass flare member and a molded glass cover member fused thereto to provide a vacuum type seal therebetween, said unit being interposed between and fused to said cover and flare members, said anode, grid and cathanode members having wiring terminal elements sealed to and projecting beyond said cover and flare members, and a hot cathode within said envelope, said envelope containing xenon gas at a partial vacuum.

5. A low impedance oscillator tube comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper and lower surfaces of said grid member on opposite sides of the respective rows of slots in the latter, the glass strips at the lower surface of said grid member being approximately .010 inch thick and the glass strips at the upper surface of said grid member being approximately .020 inch thick, said last mentioned glass strips being fused to said anode and said grid member, said first mentioned glass strips being fused to said grid member and said cathanode member, an envelope including a molded glass flare member and a molded glass cover member fused thereto to provide a vacuum type seal therebetween, said unit being interposed between and fused to said cover and flare members, said anode, grid and cathanode members having wiring terminal elements sealed to and projecting beyond said cover and flare members, a hot cathode within said envelope, said envelope containing xenon gas at a partial vacuum, and a grid associated with said cathode for the purpose of phase-controlling the oscillating power.

6. A low impedance oscillator tube comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper and lower surfaces of said grid member on opposite sides of the respective rows of slots in the latter, the glass strips at the lower surface of said grid member being approximately .010 inch thick and the glass strips at the upper surface of said grid member being approximately .020 inch thick, said last mentioned glass strips being fused to said anode and said grid member, said first mentioned glass strips being fused to said grid member and said cathanode member, a molded glass flare member and a molded glass cover member fused thereto to provide a vacuum type seal therebetween, said unit being interposed between and fused to said cover and flare members, said anode, grid and cathanode members having wiring terminal elements sealed to and projecting beyond said cover and flare members, said glass cover member having a recess therein in the form of a spiral groove facing the upper surface of said anode, and said glass cover member having inlet and outlet openings formed therein at each end of said spiral groove, whereby a cooling liquid may be circulated in contact with the upper surface of said anode.

7. A low impedance oscillator tube comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper and lower surfaces of said grid member on opposite sides of the respective rows of slots in the latter, the glass strips at the lower surface of said grid member being approximately .010 inch thick and the glass strips at the upper surface of said grid member being approximately .020 inch thick, said last mentioned glass strips being fused to said anode and said grid member, said first mentioned glass strips being fused to said grid member and said cathanode member, a molded glass flare member and a molded glass cover member fused thereto to provide a vacuum type seal therebetween, said unit being interposed between and fused to said cover and flare members, said anode, grid and cathanode members having wiring terminal elements sealed to and projecting beyond said cover and flare members, said glass cover member having a recess therein in the form of a spiral groove facing the upper surface of said anode, said glass cover member having inlet and outlet openings formed therein at each end of said spiral groove, whereby a cooling liquid may be circulated in contact with the upper surface of said anode, said glass flare member having an open lower end, a hollow metal member having its open upper end telescopically engaged with and sealed to said flare member by fusion of the latter, said metal member having a closed lower end, a body of mercury seated upon the inner surface of said lower end, and an igniting electrode penetrating said lower end and sealed thereto in insulated relationship to the same and to said body of mercury, the inner end of said electrode being reflexed toward and having a predetermined spaced relationship to the upper surface of said body of mercury.

8. A low impedance oscillator tube comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper and lower surfaces of said grid member on opposite sides of the respective rows of slots in the latter, the glass strips at the lower surface of said grid member being approximately .010 inch thick and the glass strips at the upper surface of said grid member being approximately .020 inch thick, said last mentioned glass strips being fused to said anode and said grid member, said first mentioned glass strips being fused to said grid member and said cathanode member, a molded glass flare member and a molded glass cover member fused thereto to provide a vacuum type seal therebetween, said unit being interposed between and fused to said cover and flare members, said anode, grid and cathanode members having wiring terminal elements sealed to and projecting beyond said cover and flare members, said glass cover member having a recess therein in the form of a spiral groove facing the upper surface of said anode, said glass cover member having inlet and outlet openings formed therein at each end of said spiral groove, whereby a cooling liquid may be circulated in contact with the upper surface of said anode, said glass flare member having an open lower end, a hollow metal member having its open upper end telescopically engaged with and sealed to said flare member by fusion of the latter, said metal member having a closed lower end, a body of mercury seated upon the inner surface of said lower end, an igniting electrode penetrating said lower end and sealed thereto in insulated relationship to the same and to said body of mercury, the inner end of said electrode being reflexed toward and having a predetermined spaced relationship to the upper surface of said body of mercury, a molded hollow rubber-like member fitted onto said metal member and clamped in liquid-tight relationship to the upper and lower end portions of the latter, and said rubber-like member having an inlet and an outlet opening and a spiral groove formed on the inner surface thereof in communication with said openings, whereby a cooling liquid may be circulated in contact with the outer surface of said metal member.

9. A low impedance oscillator tube comprising a laminated unit having an anode consisting of a relatively thick, flat metal sheet, and grid and cathanode members respectively consisting of like flat metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the upper and lower surfaces of said grid member on opposite sides of the respective rows of slots in the latter, the glass strips at the lower surface of said grid member being approximately .010 inch thick and the glass strips at the upper surface of said grid member being approximately .020 inch thick, said last mentioned glass strips being fused to said anode and said grid member, said first mentioned glass strips being fused to said grid member and said cathanode member, a molded glass flare member and a molded glass cover member fused thereto to provide a vacuum type seal therebetween, said unit being interposed between and fused to said cover and flare members, said anode, grid and cathanode members having wiring terminal elements sealed to and projecting beyond said cover and flare members, said glass cover member having a recess therein in the form of a spiral groove facing the upper surface of said anode, said glass cover member having inlet and outlet openings formed therein at each end of said spiral groove, whereby a cooling liquid may be circulated in contact with the upper surface of said anode, said glass flare member having an open lower end, a hollow metal member having its upper end telescopically engaged with and sealed to said flare member by fusion of the latter, said metal member having a closed lower end, a body of mercury seated upon the inner surface of said lower end, an igniting electrode penetrating said lower end and sealed thereto in insulated relationship to the same and to said body of mercury, the inner end of said electrode being reflexed toward and having a predetermined spaced relationship to the upper surface of said body of mercury, a molded hollow rubber-like member fitted onto said metal member and clamped in liquid-tight relationship to the upper and lower end portions of the latter, said rubber-like member having an inlet and an outlet opening and a spiral groove formed on the inner surface thereof in communication with said openings, whereby a cooling liquid may be circulated in contact with the outer surface of said metal member, and means affording communication between the outlet opening of said rubber-like member and the inlet opening in said glass cover member.

10. A low impedance oscillator of the grid controlled cathanode type comprising an evacuated tube having a cathode, an anode, a grid and a cathanode, said anode consisting of a relatively thick, flat metal plate and said grid and cathanode consisting of like relatively thin, flat metal plates, said last mentioned plates having a multiplicity of rows of alined perforations formed therein, means for rigidly uniting all of said plates in spaced parallel relationship to each other, said means comprising a multiplicity of relatively thin glass strips interposed between and fused to said cathanode and said grid and a corresponding number of relatively thicker glass strips interposed between and fused to said grid and said anode, said plates when assembled as a unit being interposed between and rigidly attached to a moulded glass cover member and a moulded glass flare member by partial fusion of said last mentioned glass members, said glass cover member having a recess formed therein to provide for passage of a cooling liquid between the same and the adjacent surface of said anode, said anode, grid and cathanode having wiring terminal elements sealed to and extending outwardly beyond said glass cover and flare members, and said cathode including a hollow metal member having an open upper end to which the open lower end of said flare member is sealed by fusion of the latter.

11. A low impedance oscillator of the grid controlled cathanode type comprising an evacuated tube having a cathode, an anode, a grid and a cathanode, said anode consisting of a relatively thick, flat metal plate and said grid and cathanode consisting of like relatively thin, flat metal plates, said last mentioned plates having a multiplicity of rows of alined perforations formed therein, means for rigidly uniting all of said plates in spaced parallel relationship to each other, said means comprising a multiplicity of relatively thin glass strips interposed between and fused to said cathanode and said grid and a corresponding number of relatively thicker glass strips interposed between and fused to said grid and said anode, said plates when assembled as a unit being interposed between and rigidly attached to a moulded glass cover member and a moulded glass flare member by partial fusion of said last mentioned glass members, said glass cover member having a recess formed therein to provide for passage of a cooling liquid between the same and the adjacent surface of said anode, said anode, grid and cathanode having wiring terminal elements sealed to and extending outwardly beyond said glass cover and flare members, said cathode including a hollow metal member having an open upper end to which the open lower end of said flare member is sealed by fusion of the latter, arc cooling means associated with said hollow metal member, said last mentioned means comprising a molded hollow member of rubber-like material surrounding said hollow metal member and having its upper and lower ends clamped in liquid-tight relationship to the latter, and said rubber-like member having a spiral groove formed therein adjacent said hollow metal member and inlet and outlet openings communicating with said groove, whereby a cooling liquid may be caused to flow in heat exchanging relation to said hollow metal member.

12. A low impedance oscillator of the grid controlled cathanode type comprising an evacuated tube having a cathode, an anode, a grid and a cathanode, said anode consisting of a relatively thick, flat metal plate and said grid and cathanode consisting of like relatively thin, flat metal plates, said last mentioned plates having a multiplicity of rows of alined perforations formed therein, means for rigidly uniting all of said plates in spaced parallel relationship to each other, said means comprising a multiplicity of relatively thin glass strips interposed between and fused to said cathanode and said grid and a corresponding number of relatively thicker glass strips interposed between and fused to said grid and said anode, said plates when assembled as a unit being interposed between and rigidly attached to a moulded glass cover member and a moulded glass flare member by partial fusion of said last mentioned glass members, said glass cover member having a recess formed therein to provide for passage of a cooling liquid between the same and the adjacent surface of said anode, said anode, grid and cathanode having wiring terminal elements sealed to and extending outwardly beyond said glass cover and flare members, said cathode including a hollow metal member having an open upper end to which the open lower end of said flare member is sealed by fusion of the latter, arc cooling means associated with said hollow metal member, said last mentioned means comprising a molded hollow member of rubber-like material surrounding said hollow metal member and having its upper and lower ends clamped in liquid-tight relationship to the latter, said rubber-like member having a spiral groove formed therein adjacent said hollow metal member and inlet and outlet openings communicating with said groove, whereby a cooling liquid may be caused to flow in heat exchanging relation to said hollow metal member, and means for insuring passage of the cooling liquid in sequence through said rubber-like member and the recess in said glass cover member, for the purpose set forth.

13. A low impedance oscillator of the grid controlled arc-cathanode type comprising an evacuated tube having a mercury pool cathode, an anode, a grid and a cathanode, said anode consisting of a relatively thick, flat metal plate and said grid and cathanode consisting of like relatively thin, flat metal plates, said last mentioned plates having a multiplicity of rows of alined perforations formed therein, means for rigidly uniting all of said plates in spaced parallel relationship to each other, said means comprising a multiplicity of relatively thin glass strips interposed between and fused to said cathanode and said grid and a corresponding number of relatively thicker glass strips interposed between and fused to said grid and said anode, said plates when assembled as a unit being interposed between and rigidly attached to a moulded glass cover member and a moulded glass flare member by partial fusion of said last mentioned glass members, said glass cover member having a recess formed therein to provide for passage of a cooling liquid between the same and the adjacent surface of said anode, said anode, grid and cathanode having wiring terminal elements sealed to and extending outwardly beyond said glass cover and flare members, said cathode including a hollow metal member having an open upper end to which the open lower end of said flare member is sealed by fusion of the latter, said hollow metal member having a closed lower end, and an arc starting electrode extending upwardly through said lower end and having a vacuum-tight sealed connection with the latter.

14. A low impedance oscillator of the grid controlled arc-cathanode type comprising an evacuated tube comprising a hollow lower portion composed of metal, the bottom of said portion being closed and having an arc starting electrode sealed therein, a body of mercury located within said metal portion in predetermined relationship to said exciting electrode to form a cathode, the upper portion of said tube comprising a molded glass flare sealed to the open upper end of said metal portion and a molded glass cover member sealed to the open upper end of said flare, a preformed laminated unit comprising an anode, a grid and a cathanode interposed between said flare and said cover member in sealed relationship thereto, said cover member cooperating with said anode to provide a vacuum-tight seal between the lower and upper surfaces of the latter, said anode consisting of a relatively thick, flat metal sheet, said grid and cathanode consisting of like metal sheets approximately .005 inch thick, said last mentioned sheets each having a multiplicity of rows of slots formed therein, said slots in the respective sheets being alined with each other, each slot being approximately one-fourth inch long and .010 inch wide, the slots in each row being separated from each other by an area of sheet metal approximately .008 inch wide, said rows of slots being spaced approximately one-eighth inch from each other, a multiplicity of glass strips approximately one-eighth inch wide respectively positioned upon the lower and upper surfaces of said grid on opposite sides of the respective rows of slots in the latter, the glass strips at the lower surface of said grid being approximately .010 inch thick and the glass strips at the upper surface of said grid being approximately .020 inch thick, said last mentioned glass strips being fused to said anode and said grid and said first mentioned glass strips being fused to said grid and said cathanode, and said anode, grid and cathanode having wiring terminal elements projecting outwardly beyond said glass cover member and said glass flare in vacuum-tight sealed relationship thereto.

15. The method of making an anode, grid and cathanode unit for use in a low impedance oscillator type power tube, which comprises, forming an anode of relatively thick sheet metal, forming like grid and cathanode members of very thin sheet metal, forming in the grid and cathanode members like numbers of rows of openings, the openings in each row being separated from each other by like relatively narrow areas of sheet metal, said rows of openings being spaced a predetermined distance from each other, positioning upon said cathanode member pluralities of strips of glass and of a soluble refractory material, such as partially sintered magnesia, said strips of refractory material overlying the respective rows of openings and said strips of glass being positioned on opposite sides of the respective rows of openings, positioning said grid member upon said strips of glass and refractory material in a relation to provide for alinement of the openings in the respective cathanode and grid members, positioning upon said grid member pluralities of glass and refractory strips corresponding in number with those aforementioned and respectively alined with the latter, positioning said anode upon said last mentioned glass and refractory strips, subjecting said elements jointly to a predetermined degree of heat and a predetermined degree of molding pressure, to thereby effect fusion of said glass strips and uniting thereof to said cathanode and grid and to said grid and anode, and thereafter subjecting the unit so formed to contact with a dilute acid to effect complete removal of said strips of refractory material.

16. The method of making an anode, grid and cathanode unit for use in a low impedance oscillator type power tube, which comprises, forming an anode of relatively thick sheet metal, forming like grid and cathanode members of very thin sheet metal, forming in the grid and cathanode members like numbers of rows of openings, the openings in each row being separated from each other by like relatively narrow areas of sheet metal, said rows of openings being spaced a predetermined distance from each other, positioning upon said cathanode member pluralities of strips of glass and of a soluble refractory material, such as partially sintered magnesia, said strips of refractory material overlying the respective rows of openings and said strips of glass being positioned on opposite sides of the respective rows of openings, positioning said grid member upon said strips of glass and refractory material in a relation to provide for alinement of the openings in the respective cathanode and grid members, positioning upon said grid member pluralities of glass and refractory strips corresponding in number with those aforementioned and respectively alined with the latter, positioning said anode upon said last mentioned glass and refractory strips, subjecting said elements jointly to a predetermined degree of heat and a predetermined degree of molding pressure, to thereby effect fusion of said glass strips and uniting thereof to said cathanode and grid and to said grid and anode, thereafter subjecting the unit so formed to contact with a dilute acid to effect complete removal of said strips of refractory material, each plurality of strips of refractory material being substantially thinner than the glass strips when initially associated therewith, and the refractory strips positioned between the cathanode and grid being substantially thinner than those positioned between the grid and anode.

17. The method of making a laminated electrode unit for use in a low impedance oscillator type power tube, which comprises, forming a sheet metal anode of about one-sixteenth inch thickness and about two and three-fourths inches square, forming like sheet metal grid and cathanode members of about .005 inch thickness, substantially two and three-fourths inches width and substantially more than two and three-fourths inches length, forming in the grid and cathanode members a multiplicity of rows of slots, each slot being approximately one-fourth inch long and .010 inch wide, the slots in each row being separated from each other by an area of sheet metal approximately .008 inch wide, said rows of slots being spaced approximately one-eighth inch from each other, positioning upon the upper surface of said cathanode member a number of strips of partially sintered magnesia one-fourth inch wide and .010 inch thick to overlie the respective rows of slots, positioning upon opposite sides of the respective rows of slots a number of glass strips of slightly less than one-eighth inch width and slightly more than .010 inch thickness, positioning said grid member upon said glass strips in a relation to provide for alinement of the slots in the respective cathanode and grid members, positioning upon said grid member, in alinement with the respective rows of slots therein, a corresponding number of strips of partially sintered magnesia one-fourth inch wide and .020 inch thick, positioning upon opposite sides of the respective rows of slots last mentioned a corresponding number of glass strips of slightly less than one-eighth inch width and slightly more than .020 inch thickness, positioning said anode upon said last mentioned strips, subjecting said elements jointly to a predetermined degree of heat and a predetermined degree of molding pressure, to thereby effect fusion of said glass strips and uniting thereof to said cathanode and grid and to said grid and anode, and thereafter subjecting the unit so formed to contact with a dilute acid to effect complete removal of the magnesia strips aforementioned.

IRVIN W. COX.
LESTER D. DRUGMAND.
RAYMOND E. MEKELBURG.

REFERENCES CITED

The following references are of record in the file of this patent:

UNITED STATES PATENTS

| Number | Name | Date |
|---|---|---|
| 1,230,708 | Hewitt | June 19, 1917 |
| 1,369,984 | Schafer | Mar. 1, 1921 |
| 2,129,849 | Laico | Sept. 13, 1938 |
| 2,262,901 | Murphy | Nov. 18, 1941 |